United States Patent
Adham et al.

(10) Patent No.: US 10,315,176 B2
(45) Date of Patent: Jun. 11, 2019

(54) PLUG FLOW REACTOR WITH INTERNAL RECIRCULATION FLUIDIZED BED

(71) Applicant: HATCH LTD., Mississauga (CA)

(72) Inventors: Kamal Adham, Toronto (CA); Christopher Thomas Harris, Toronto (CA); Alexandre Kokourine, Mississauga (CA)

(73) Assignee: HATCH LTD., Mississauga (CA)

( * ) Notice: Subject to any disclaimer, the term of this patent is extended or adjusted under 35 U.S.C. 154(b) by 168 days.

(21) Appl. No.: 15/317,416

(22) PCT Filed: May 8, 2015

(86) PCT No.: PCT/CA2015/050407
§ 371 (c)(1),
(2) Date: Dec. 9, 2016

(87) PCT Pub. No.: WO2015/188267
PCT Pub. Date: Dec. 17, 2015

(65) Prior Publication Data
US 2017/0120211 A1 May 4, 2017

Related U.S. Application Data

(60) Provisional application No. 62/009,486, filed on Jun. 9, 2014.

(51) Int. Cl.
*B01J 8/24* (2006.01)
*B01J 8/20* (2006.01)
(Continued)

(52) U.S. Cl.
CPC ............... *B01J 8/24* (2013.01); *B01J 8/1854* (2013.01); *B01J 8/1872* (2013.01); *B01J 8/20* (2013.01);
(Continued)

(58) Field of Classification Search
CPC ..... B01J 8/18; B01J 8/1872; B01J 8/22; B01J 8/226; B01J 8/24; B01J 8/36; C22B 1/10
See application file for complete search history.

(56) References Cited

U.S. PATENT DOCUMENTS 3,411,465 A 11/1968 Shiral
3,799,077 A 3/1974 Lowe
(Continued)

FOREIGN PATENT DOCUMENTS

WO WO 01/43861 6/2001
WO WO014386 A1 6/2001
(Continued)

OTHER PUBLICATIONS

Schaschke, C. (2014) Dictionary of Chemical Engineering, Oxford University Press, 448 pages (Office action cites p. 158).*
(Continued)

Primary Examiner — Brian A McCaig
(74) Attorney, Agent, or Firm — DeLio, Peterson & Curcio, LLC; Thomas E. Ciesco

(57) ABSTRACT

A reactor comprises an outer sidewall and a bottom wall enclosing a hollow chamber comprising a lower fluidized bed zone and an upper freeboard zone. A plurality of inlets is provided for injecting at least one fluidizing medium into the fluidized bed zone and creating a swirling flow. At least one feed inlet communicates with the fluidized bed zone; and at least one product outlet is provided for removing a product from the chamber, the outlet(s) communicating with either the fluidized bed zone or the freeboard zone. The reactor has at least one internal barrier located inside the hollow chamber, and at least partly located in the fluidized bed zone. The internal barrier(s) have at least one opening within the fluidized bed zone, such as an underflow opening,
(Continued)

to permit internal recirculation of material from the product zone to the feed zone, thereby simplifying reactor structure.

8 Claims, 7 Drawing Sheets

(51) Int. Cl.

| | |
|---|---|
| *B01J 8/22* | (2006.01) |
| *B01J 8/26* | (2006.01) |
| *B01J 8/34* | (2006.01) |
| *C10B 49/10* | (2006.01) |
| *C10B 53/02* | (2006.01) |
| *C10B 57/12* | (2006.01) |
| *B01J 8/18* | (2006.01) |
| *C02F 3/30* | (2006.01) |
| *C22B 1/10* | (2006.01) |
| *F26B 3/084* | (2006.01) |

(52) U.S. Cl.
CPC ............... *B01J 8/226* (2013.01); *B01J 8/26* (2013.01); *B01J 8/34* (2013.01); *C02F 3/301* (2013.01); *C10B 49/10* (2013.01); *C10B 53/02* (2013.01); *C10B 57/12* (2013.01); *C22B 1/10* (2013.01); *F26B 3/084* (2013.01); *B01J 2208/0084* (2013.01); *B01J 2208/00752* (2013.01); *B01J 2208/00893* (2013.01); *B01J 2208/00938* (2013.01); *Y02E 50/14* (2013.01)

(56) References Cited

U.S. PATENT DOCUMENTS

| | | | |
|---|---|---|---|
| 4,191,539 A | 3/1980 | Patel et al. | |
| 4,248,164 A | 2/1981 | Isheim | |
| 4,298,453 A | 11/1981 | Schoennagel et al. | |
| 4,479,920 A | 10/1984 | Dodson | |
| 4,646,637 A | 3/1987 | Cloots | |
| 4,915,061 A | 4/1990 | Garcia-Mallol | |
| 5,165,908 A | 11/1992 | Van Slooten et al. | |
| 5,343,830 A | 9/1994 | Alexamder et al. | |
| 6,883,442 B1 | 4/2005 | Groszek et al. | |
| 7,261,811 B2 | 8/2007 | Nakhla et al. | |
| 7,579,383 B2 | 8/2009 | Lattner | |
| 8,100,990 B2 | 1/2012 | Ellens et al. | |
| 8,431,757 B2 | 4/2013 | Cheiky et al. | |
| 8,546,636 B1 | 10/2013 | Potgieter et al. | |
| 8,580,019 B2 | 11/2013 | Reardon et al. | |
| 8,628,589 B2 | 1/2014 | Ramirez Corredores et al. | |
| 8,669,405 B2 | 3/2014 | Ramirez Corredores et al. | |
| 2007/0027220 A1 | 2/2007 | Lattner | |
| 2010/0197879 A1* | 8/2010 | De Broqueville | ....... B01J 2/006 526/348 |
| 2011/0159180 A1 | 6/2011 | Ledoux et al. | |
| 2011/0172092 A1 | 7/2011 | Lee et al. | |
| 2011/0252699 A1 | 10/2011 | Shepard | |
| 2011/0308155 A1 | 12/2011 | Paskach et al. | |
| 2012/0204479 A1 | 8/2012 | Ramirez Corredores et al. | |
| 2012/0205288 A1 | 8/2012 | Jia et al. | |
| 2013/0123103 A1 | 5/2013 | Anderson et al. | |
| 2013/0131196 A1 | 5/2013 | Cheiky et al. | |
| 2013/0233038 A1 | 9/2013 | Lee et al. | |
| 2013/0256113 A1 | 10/2013 | Tumiatti et al. | |
| 2014/0069797 A1 | 3/2014 | Daugaard et al. | |
| 2014/0073708 A1 | 3/2014 | Cheiky et al. | |
| 2014/0082996 A1 | 3/2014 | Cheiky et al. | |

FOREIGN PATENT DOCUMENTS

| | | |
|---|---|---|
| WO | WO2011159154 A1 | 12/2011 |
| WO | WO2011159352 A2 | 12/2011 |
| WO | WO2014031776 A2 | 2/2014 |

OTHER PUBLICATIONS

Seville, J.P.K. et al. (2016) Particle Technology and Engineering: An Engineer's Guide to Particles and Powders: Fundamentals and Computational Approaches, Butterworth-Heinemann, 281 pages (Office action cites pp. 83, 86-90, & 99).*

* cited by examiner

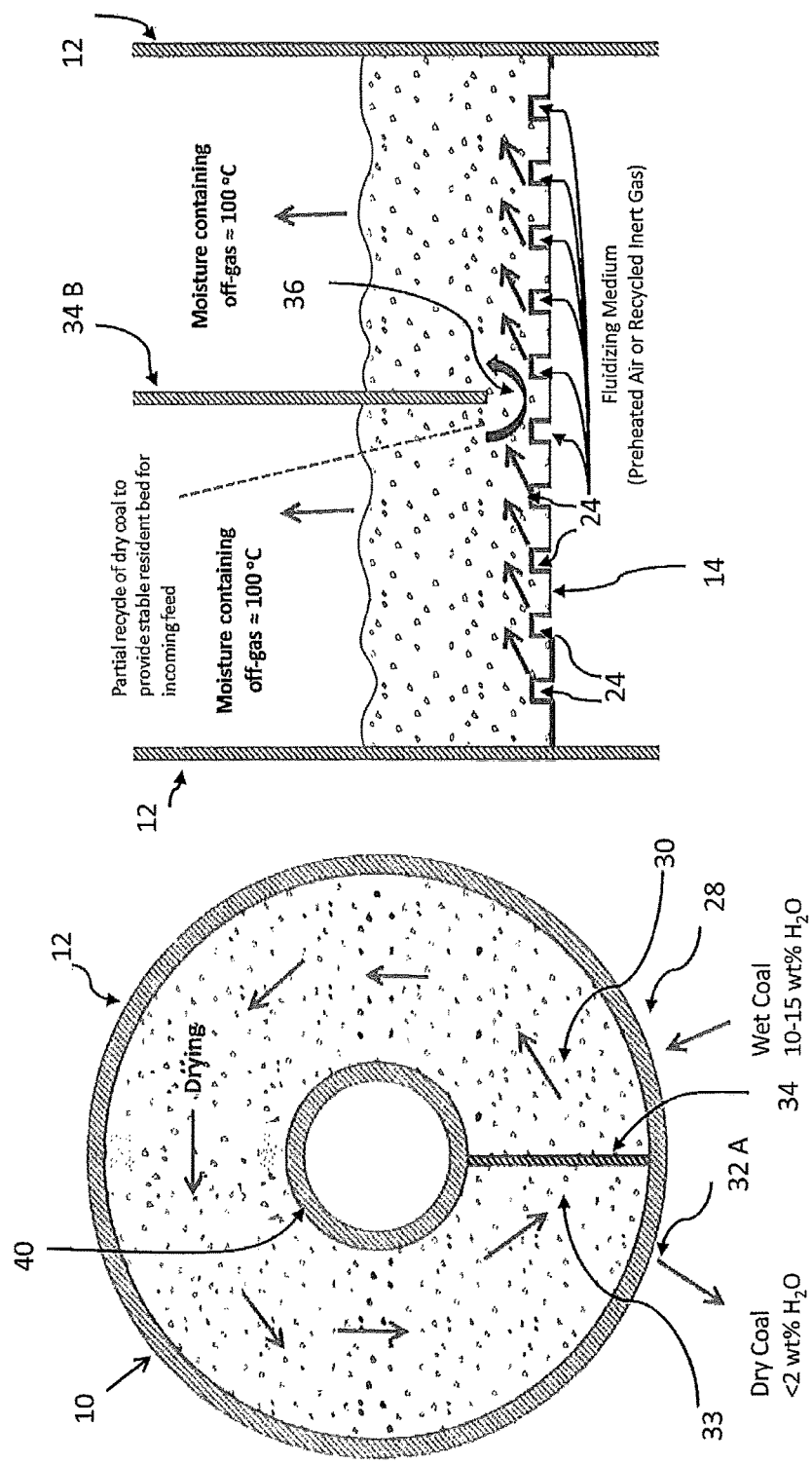

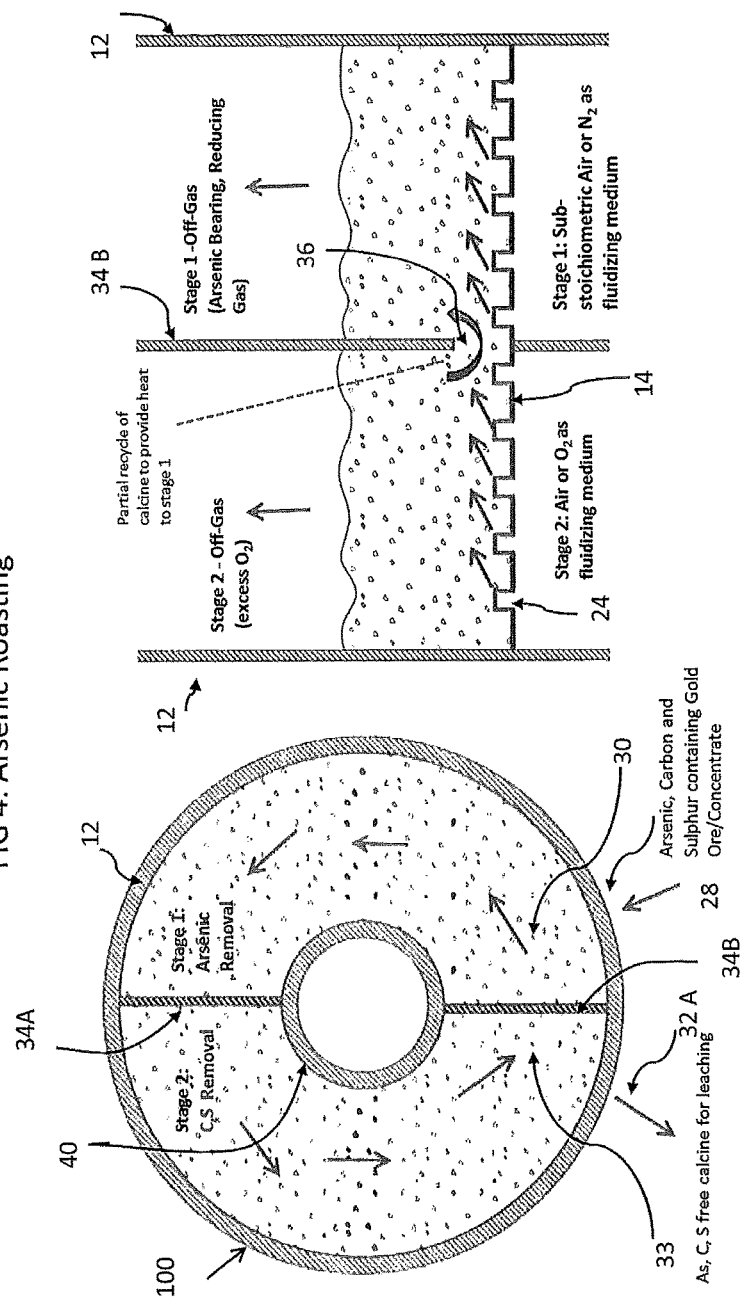
FIG 4: Arsenic Roasting

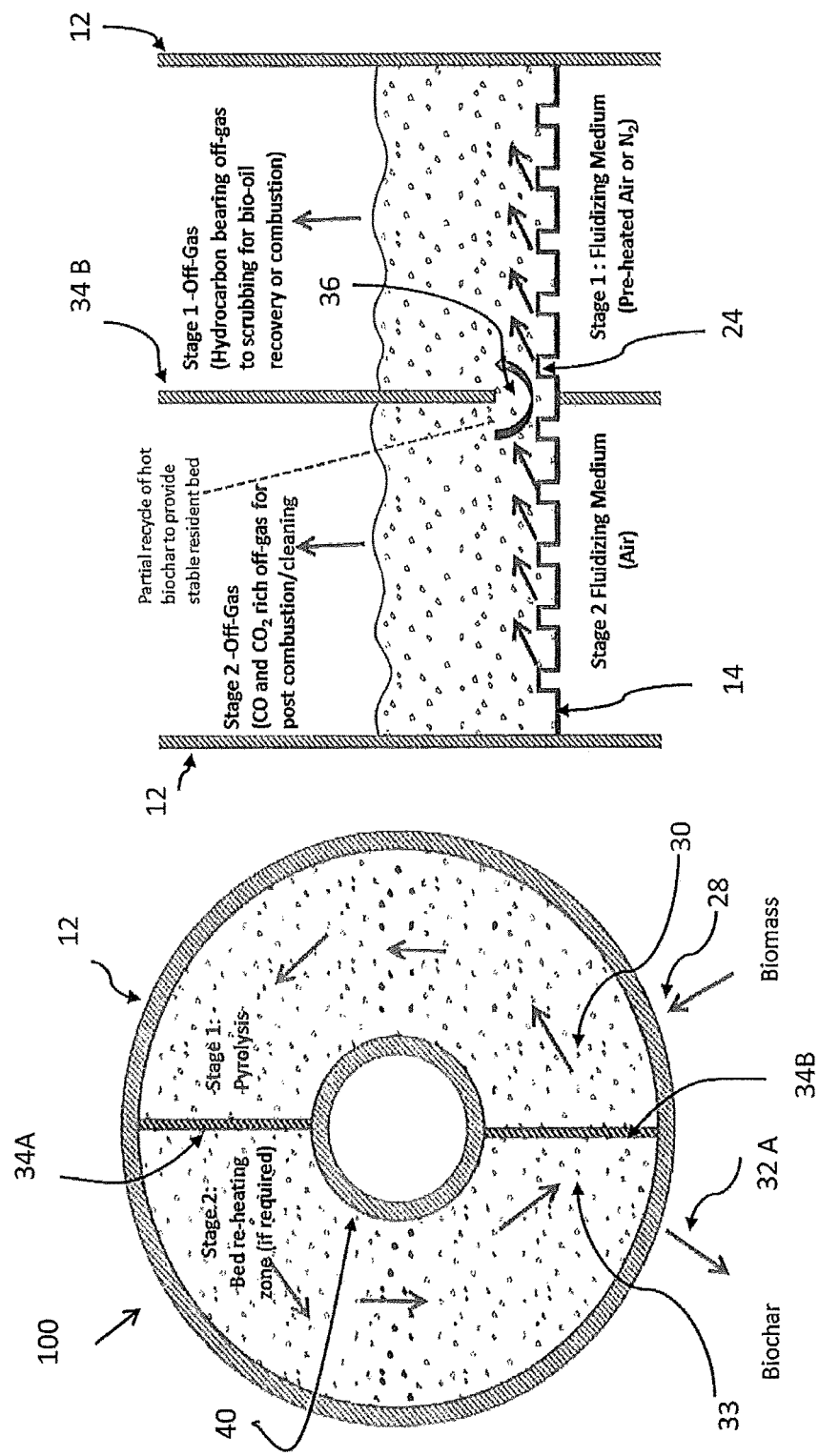
FIG 5: Biomass Pyrolysis

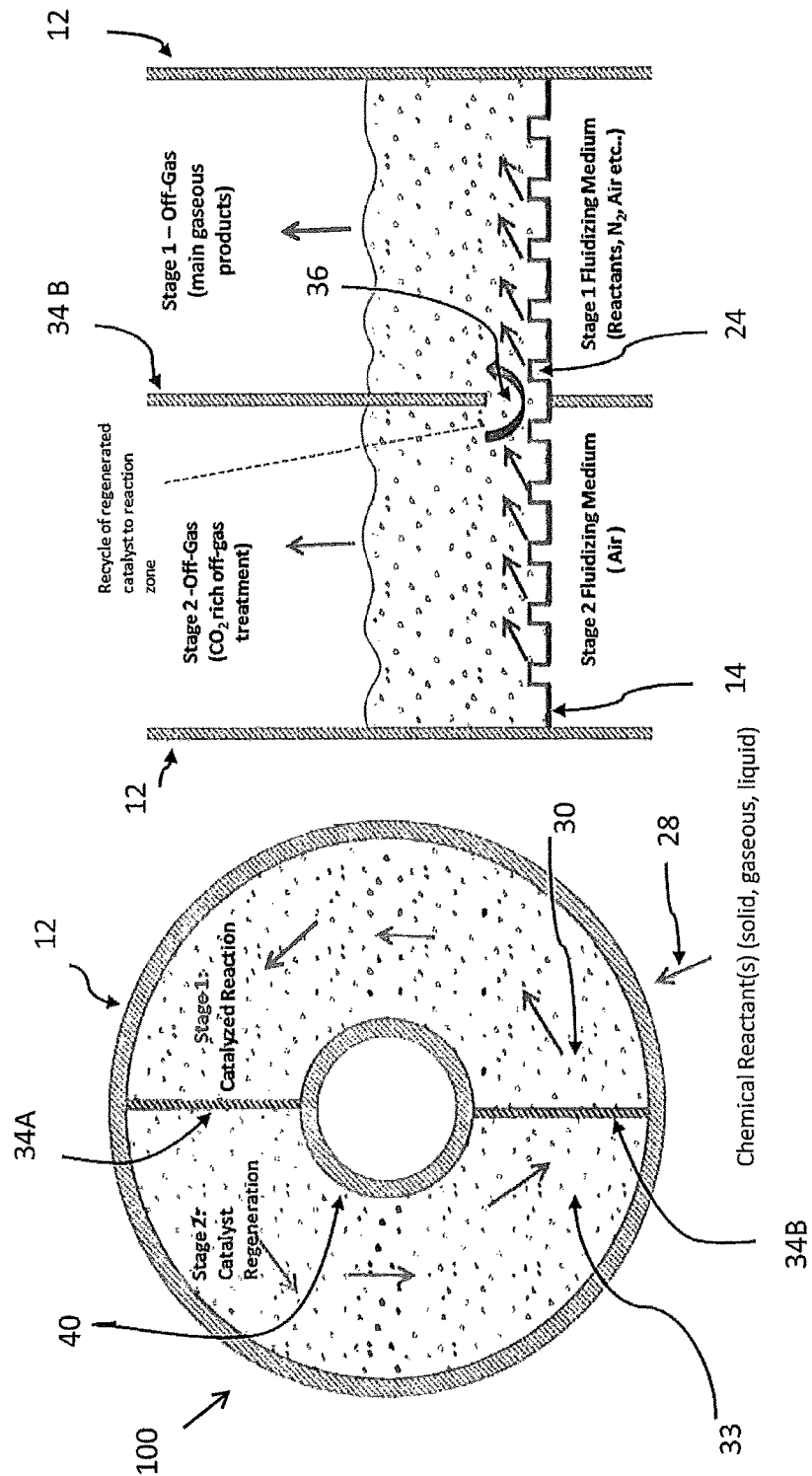
FIG 6: Catalytic Reactor

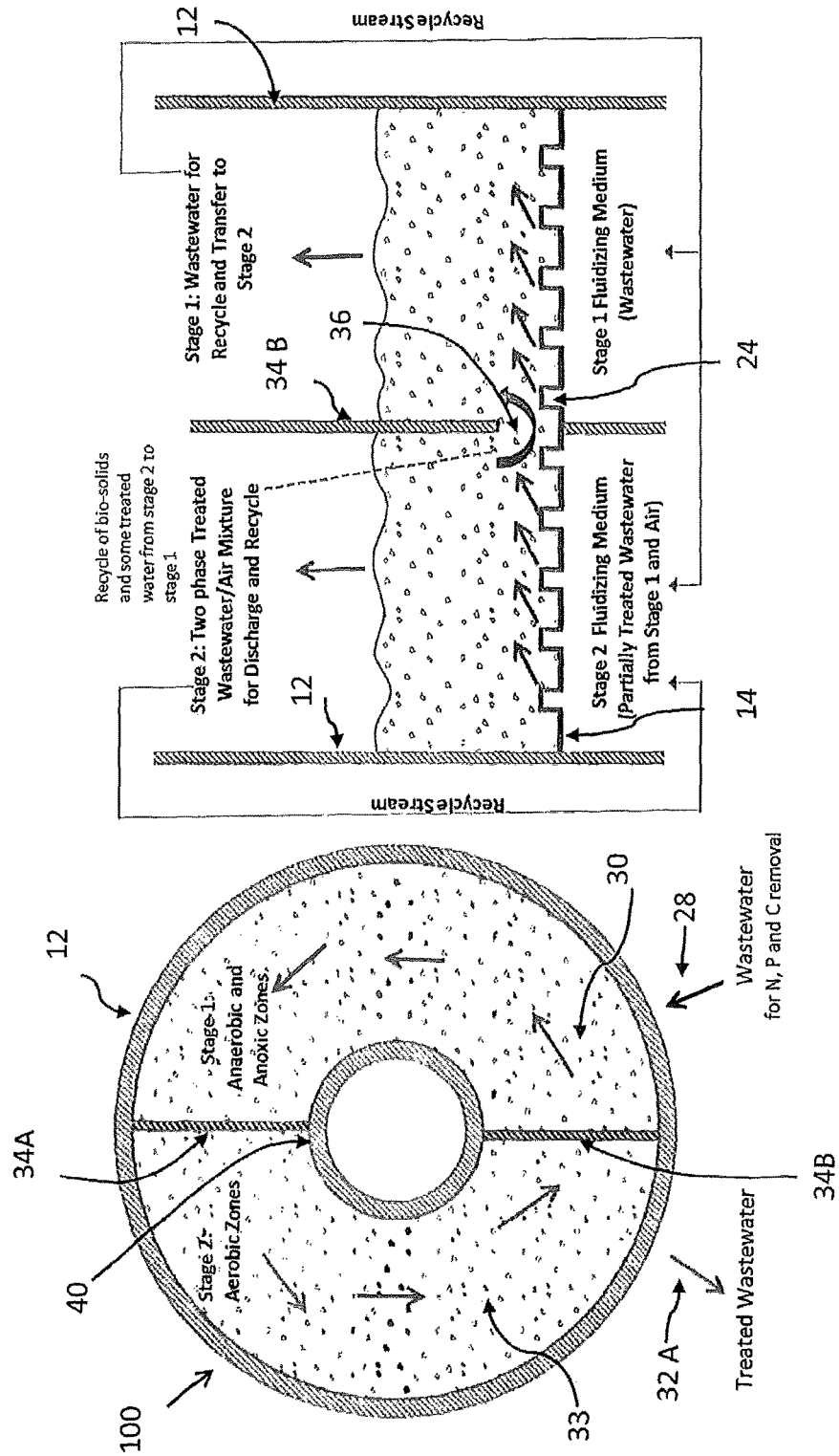

PLUG FLOW REACTOR WITH INTERNAL RECIRCULATION FLUIDIZED BED

CROSS-REFERENCE TO RELATED APPLICATION

This application claims priority to and the benefit of U.S. Provisional Patent Application No. 62/009,486 filed Jun. 9, 2014, the contents of which are incorporated herein by reference.

BACKGROUND OF THE INVENTION

1. Field of the Invention

The present disclosure relates to plug flow, fluidized bed reactors, and particularly to such reactors in which the product zone and feed zone are separated by one or more underflow weirs to permit internal recirculation of material from the product zone to the feed zone. The disclosure also relates to methods of using such reactors to process a variety of particulate materials.

2. Description of Related Art

A fluidized bed reactor typically comprises a processing chamber which is partially filled with particulate matter such as sand. The floor of the chamber is perforated to allow a fluidizing medium, such as a hot gas, to be injected into the chamber to fluidize and heat and/or react with the particles. Particulate matter to be processed is simultaneously supplied to the fluidized bed through an inlet and mixes with the heated and/or reactive particles and the fluidizing medium to be heated and optionally undergo a reaction.

Plug flow reactors are used in applications requiring reaction conditions having minimal back-mixing.

Currently used fluidized bed reactors can be complex, and may include multiple fluid beds in multiple reactors, external circuits for recirculation of processed matter from the product zone to the feed zone. There remains a need for simpler plug flow, fluidized bed reactors which provide lower equipment costs and/or lower operating costs than known reactors.

SUMMARY OF THE INVENTION

In an embodiment, there is provided a reactor comprising: an outer sidewall and a bottom wall enclosing a hollow chamber comprising a lower fluidized bed zone and an upper freeboard zone; a plurality of fluidizing medium inlets for injection of at least one fluidizing medium into the fluidized bed zone, wherein the fluidizing medium inlets are adapted to create a swirling flow of material in the fluidized bed zone; at least one feed inlet communicating with the fluidized bed zone; at least one product outlet for removing a product from the chamber, wherein the at least one product outlet communicates with either the fluidized bed zone or the freeboard zone; and at least one internal barrier located inside the hollow chamber and at least partly located in the fluidized bed zone, wherein each said internal barrier is positioned to face in a direction of said swirling flow, and each said barrier has at least one opening within the fluidized bed zone.

In an embodiment, each said barrier has a bottom edge which is spaced above the bottom wall, and wherein said at least one opening comprises an underflow opening within the fluidized bed zone, between the bottom wall and the bottom edge of the barrier.

In an embodiment, the outer sidewall has a substantially cylindrical shape, and has a central axis. The reactor may further comprise a substantially cylindrical inner sidewall, and/or each of said barriers may comprise a planar plate extending radially from the outer sidewall toward the central axis.

In an embodiment, the reactor includes one of said barriers, and said barrier is located between the feed inlet and the product outlet, so as to prevent short-circuiting of flow between the feed inlet and the product outlet. For example, both the feed inlet and the product outlet are provided in the outer sidewall and communicate with the fluidized bed zone.

In an embodiment, the fluidizing medium inlets are located in the bottom wall of the reactor, or the fluidizing medium inlets are located in the outer side wall of the reactor, in communication with the lower fluidized bed zone. For example, the fluidizing medium inlets may comprise gas and/or liquid injectors which are directed in a direction of the swirling fluid flow.

In an embodiment, each said barrier has a top edge located above the fluidized bed zone.

In an embodiment, the reactor includes at least two of said barriers, and the barriers extend throughout the height of the reactor so as to divide the hollow chamber into at least two sections, wherein the sections are separated by the barriers, except that communication between adjacent sections is provided through the at least one opening of each of the barriers. For example, a sub-group of said plurality of fluidizing inlets is provided in each of said sections, and the sub-groups are configured to inject different fluidizing media into the hollow chamber, and/or each of the sections includes at least one of said product outlets.

In an embodiment, the reactor comprises a particulate dryer, in which the outer side wall has a substantially cylindrical shape and has a central axis; the plurality of fluidizing medium inlets are located in the bottom wall; the reactor comprises one said feed inlet comprising an inlet for particulate solid to be dried; the reactor comprises a first one of said product outlets and a second one of said product outlets, wherein the first product outlet comprises an outlet for dried particulate solids communicating with the fluidized bed zone; and the second product outlet comprises a gas outlet communicating with the freeboard zone; the reactor comprises one said barrier which is located between the feed inlet and the product outlet, and wherein the barrier has a top edge which is located proximate to a top of the fluidized bed zone.

In an embodiment, there is provided a method for drying wet particulate solids in the particulate dryer. The method comprises: supplying said wet particulate solids to be dried to a fluidized bed of dried particles in the fluidized bed zone of the reactor, wherein the fluidized bed is at an elevated temperature; injecting said fluidizing medium into the fluidized bed zone, wherein the fluidizing medium comprises a hot gas; drying the wet particulate solids with said hot gas as the fluidized bed flows from the feed inlet toward the product outlet; recovering a first portion of the dried particulate solids through the product outlet; recycling a second portion of the dried particulate solids by permitting them to flow through said at least one opening to combine with said wet particulate solids to be dried entering the chamber through said feed inlet; and discharging said fluidizing medium from said product outlet.

In an embodiment, the reactor comprises a biomass pyrolysis apparatus, in which: the outer side wall has a substantially cylindrical shape and has a central axis; the reactor includes two of said barriers, both of which extend throughout the height of the reactor so as to separate the hollow chamber into a first section for pyrolysis of the biomass and a second section for optionally re-heating the fluidized bed, and wherein communication between the first and second sections is provided by the at least one openings of the barriers; the plurality of fluidizing medium inlets are located in the bottom wall, wherein a first sub-group of said plurality of fluidizing inlets is provided in the first section, and a second sub-group of said plurality of fluidizing inlets is provided in the second section; the reactor comprises one said feed inlet comprising an inlet for biomass and optionally inert particulate matter, wherein the feed inlet is located in said first section;

the reactor comprises a first said product outlet, comprising an outlet for biochar, wherein the outlet for biochar is located in the second section and communicates with the fluidized bed zone; the reactor comprises a second said product outlet, comprising an outlet for a first off-gas communicating with the freeboard zone in the first section; and the reactor comprises a third said product outlet, comprising an outlet for a second off-gas communicating with the freeboard zone in the second section.

In an embodiment, there is provided a method for pyrolyzing biomass in the biomass pyrolysis apparatus. The method comprises: supplying said biomass and optionally inert particulate matter through the biomass inlet to a fluidized bed of particles in the fluidized bed zone of the reactor, wherein the fluidized bed is at an elevated temperature; injecting a first said fluidizing medium into the fluidized bed zone in the first section of the reactor, wherein the first fluidizing medium comprises air; discharging said first off-gas from the first section; flowing the fluidized bed from the first section to the second section; injecting a second said fluidizing medium into the fluidized bed zone in the second section of the reactor, wherein the second fluidizing medium comprises air; recovering a first portion of the biochar particles through the product outlet; recycling a second portion of the hot biochar particles, optionally with said inert particulate matter, by permitting them to flow through said at least one opening to combine with said biomass entering the chamber through said feed inlet; and discharging said second off-gas from the second section.

In an embodiment, the reactor comprises a gold ore roasting apparatus, in which: the outer side wall has a substantially cylindrical shape and has a central axis; the reactor includes two of said barriers, both of which extend throughout the height of the reactor so as to separate the hollow chamber into a first section for removal of arsenic species and a second section for removal of carbon and sulfur, and wherein communication between the first and second sections is provided by the at least one openings of the barriers; the plurality of fluidizing medium inlets are located in the bottom wall, wherein a first sub-group of said plurality of fluidizing inlets is provided in the first section, and a second sub-group of said plurality of fluidizing inlets is provided in the second section; the reactor comprises one said feed inlet comprising an inlet for gold ore and/or concentrate, wherein the feed inlet is located in said first section; the reactor comprises a first said product outlet, comprising an outlet for calcine, wherein the outlet for calcine is located in the second section and communicates with the fluidized bed zone; the reactor comprises a second said product outlet, comprising an outlet for a first off-gas communicating with the freeboard zone in the first section; and the reactor comprises a third said product outlet, comprising an outlet for a second off-gas communicating with the freeboard zone in the second section.

In an embodiment, there is provided a method for roasting gold ore and/or concentrate in the gold ore roasting apparatus. The method comprises: supplying said gold ore and/or concentrate through the feed inlet to a fluidized bed of particles in the fluidized bed zone of the reactor, wherein the fluidized bed is at an elevated temperature; injecting a first said fluidizing medium into the fluidized bed zone in the first section of the reactor, wherein the first fluidizing medium comprises sub-stoichiometric air or nitrogen; discharging said first off-gas from said second product outlet, wherein the first off-gas contains said arsenic species; flowing the fluidized bed from the first section to the second section; injecting a second said fluidizing medium into the fluidized bed zone in the second section of the reactor, wherein the second fluidizing medium comprises air or oxygen; recovering a first portion of the hot calcine particles through the product outlet; recycling a second portion of the hot calcine particles by permitting them to flow through said at least one opening to combine with said gold ore and/or concentrate entering the chamber through said feed inlet; and discharging said second off-gas from the second section, wherein the second off-gas contains oxides of carbon and sulfur.

In an embodiment, the reactor comprises a catalytic reactor, in which: the outer side wall has a substantially cylindrical shape and has a central axis; the reactor includes two of said barriers, both of which extend throughout the height of the reactor so as to separate the hollow chamber into a first section for a catalyzed reaction in the presence of a catalyst and a second section for regeneration of the catalyst, and wherein communication between the first and second sections is provided by the at least one openings of the barriers; the plurality of fluidizing medium inlets are located in the bottom wall, wherein a first sub-group of said plurality of fluidizing inlets is provided in the first section, and a second sub-group of said plurality of fluidizing inlets is provided in the second section; the reactor comprises one said feed inlet comprising an inlet for one or more reactants in solid, liquid and/or gaseous form, wherein the feed inlet is located in said first section; the reactor comprises a first said product outlet, comprising an outlet for one or more products of said catalyzed reaction, wherein the first product outlet is located in the first section and communicates with the freeboard zone; the reactor comprises a second said product outlet, comprising an outlet for an off-gas communicating with the freeboard zone in the second section.

In an embodiment, there is provided a method for conducting a catalyzed reaction in the catalytic reactor. The method comprises: supplying said one or more reactants through the feed inlet to a fluidized bed of particles in the fluidized bed zone of the reactor, wherein the fluidized bed is at an elevated temperature and contains said catalyst; injecting a first said fluidizing medium into the fluidized bed zone in the first section of the reactor, wherein the first fluidizing medium comprises one or more reactants, air and/or nitrogen; discharging said one or more products of said catalyzed reaction from said first product outlet; flowing the fluidized bed from the first section to the second section; injecting a second said fluidizing medium into the fluidized bed zone in the second section of the reactor to regenerate the catalyst, wherein the second fluidizing medium comprises hot air; flowing the fluidized bed containing the hot regenerated catalyst from the second section to the first section to combine the fluidized bed containing the regenerated catalyst with said one or more reactants entering the chamber; and discharging said off-gas from the second section.

In an embodiment, the reactor comprises an aerobic/anaerobic bio reactor, in which: the outer side wall has a substantially cylindrical shape and has a central axis; the reactor includes two of said barriers which separate the hollow chamber into a first section comprising anaerobic and anoxic zones, and a second section comprising an aerobic zone, and wherein communication between the first and second sections is provided by the at least one openings of the barriers; the plurality of fluidizing medium inlets are located in the bottom wall, wherein a first sub-group of said plurality of fluidizing inlets is provided in the first section, and a second sub-group of said plurality of fluidizing inlets is provided in the second section; the reactor comprises one said feed inlet comprising an inlet for wastewater, wherein the feed inlet is located in said first section; the reactor comprises a first said product outlet, comprising an outlet for treated wastewater, wherein the outlet for treated wastewater is located in the second section and communicates with the fluidized bed zone; the reactor comprises a first recycling circuit for recycling a portion of the wastewater from the first section to the first sub-group of fluidizing inlets; and the reactor comprises a second recycling circuit for recycling a portion of the treated wastewater from the second section to the second sub-group of fluidizing inlets.

In an embodiment, there is provided a method for treating waste water in the aerobic/anaerobic bio reactor. The method comprises: supplying said waste water through the feed inlet to a circulating fluid in the fluidized bed zone of the reactor, wherein the circulating fluid includes a reactive and suspended biofilm; optionally injecting a first said fluidizing medium into the fluidized bed zone in the first section of the reactor, wherein the first fluidizing medium comprises a portion of said waste water recycled from said first section; flowing the fluid from the first section to the second section; injecting a second said fluidizing medium into the fluidized bed zone in the second section of the reactor, wherein the second fluidizing medium comprises said wastewater recycled from said first section and/or said treated wastewater recycled from said second section, and/or air or oxygen, wherein an aerated biofilm is regenerated; recovering a first portion of the treated wastewater through the product outlet; recycling a second portion of the treated wastewater by permitting it to flow through said at least one opening to combine with said wastewater entering the chamber through said feed inlet; and flowing the fluidized bed containing the aerated and regenerated biofilm from the second section to the first section to combine the fluidized bed containing the biofilm with said waste water entering the chamber through said feed inlet.

BRIEF DESCRIPTION OF THE DRAWINGS

The invention will now be described, by way of example only, with reference to the attached drawings, in which:

FIG. 3 is a schematic view of a plug flow, fluidized bed reactor for use in a coal drying application;

FIG. 4 is a schematic view of a plug flow, fluidized bed reactor for use in an arsenic roasting application;

FIG. 5 is a schematic view of a plug flow, fluidized bed reactor for use in a biomass pyrolysis application;

FIG. 6 is a schematic view of a plug flow, fluidized bed reactor for use as a catalytic reactor; and FIG. 7 is a schematic view of a plug flow, fluidized bed reactor for use as a two-stage aerobic/anaerobic bio reactor.

DESCRIPTION OF THE PREFERRED EMBODIMENT(S)

The following is a detailed description of plug flow, fluidized bed reactors having one or more underflow weirs to separate the product zone and feed zone and to permit internal recirculation of material from the product zone to the feed zone. The detailed description also relates to methods of using such reactors to process a variety of particulate materials, for example in drying applications, roasting applications, pyrolysis/cracking applications, thermal power/gasification applications, chemical applications, and biological applications.

Figure 1:
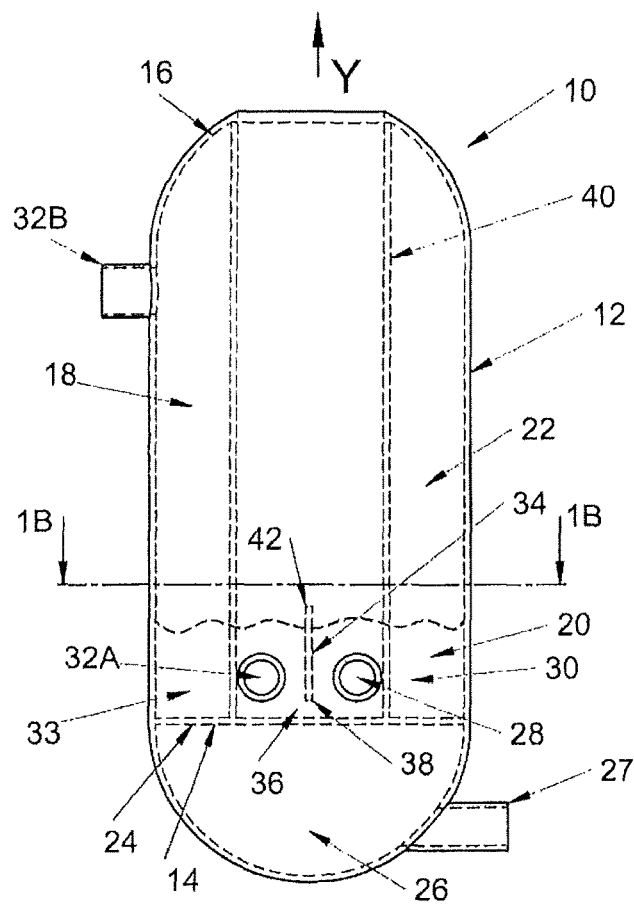
FIGS. 1A and 1B are side and top sectional views of a plug flow, fluidized bed reactor according to a first embodiment, having a single underflow weir.
Figure 1:
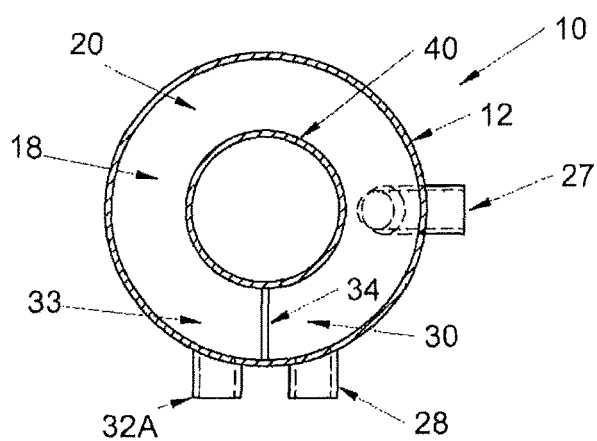

FIGS. 1A and 1B illustrate a reactor 10 according to a first embodiment. Reactor 10 comprises an outer side wall 12, a bottom wall 14, and a top 16. The interior of the reactor 10, above bottom wall 14, comprises a hollow chamber 18 which includes a lower fluidized bed zone 20 and an upper freeboard zone 22.

The outer side wall 12 is shaped so as to define a hollow chamber 18 in the form of a closed loop for circulation of the fluidized bed. The side wall 12 and/or chamber 18 may have rounded corners so as to promote a swirling flow. The side wall 12 and/or chamber 18 are sometimes referred to herein as being "substantially cylindrical", meaning that they are approximately vertical and have a rounded cross-sectional shape, wherein the rounded cross-sectional shape may be circular, oval, racetrack-shaped, rectangular or other polygon shape with rounded corners, etc. The outer side wall 12 also defines a central vertical axis Y of the reactor 10.

The reactor 10 includes a plurality of fluidizing medium inlets 24 for injection of at least one fluidizing medium into the fluidized bed zone 20. These inlets 24 are in communication with the fluidized bed zone 20 and may be located in the lower portion of side wall 12 and/or in the bottom wall 14. In FIGS. 1A and 1B, the fluidizing medium inlets 24 are arranged throughout the bottom wall 14, and an inlet chamber 26 may be provided below the bottom wall 14 into which the fluidizing medium may be supplied through an inlet 27, and from which the fluidizing medium is injected into the fluidized bed zone 20 through the inlets 24.

The fluidizing medium inlets 24 are arranged so as to create a swirling flow of material, comprising gaseous, liquid, and/or solid matter of the fluidized bed, inside the chamber 18. Although the inlets 24 are shown in FIG. 1A as comprising simple apertures, it will be appreciated that the inlets may comprise directional nozzles or other injection devices facing in the direction of the swirling flow, and these injection devices may, for example, comprise directional, high-speed, bottom-bed injection tuyeres to induce the suspension and circulation of solids within the circulating fluidized bed.

Where the inlets 24 are located in the side wall, they may be arranged so as to direct the fluidizing medium tangentially along the side wall 12.

The reactor 10 further comprises at least one feed inlet 28 which may be located in the lower portion of the side wall 12, in communication with the fluidized bed zone 20. The feed inlet 28 provides a feed of a gaseous, liquid and/or solid material to be processed into the fluidized bed. The area of chamber 18 into which the feed material is introduced is sometimes referred to herein as the "feed zone" 30.

The reactor 10 further comprises at least one product outlet 32 for removing a product from the chamber 18. The term "product" is used herein in a broad sense, to include all gaseous, liquid and/or solid materials which are removed from the chamber 18, whether they are reaction products, by-products, off-gases etc. Depending on the nature of the products, the at least one outlet 32 may be located in the side wall 12 or the top 16 of the reactor 10. For example, where the product includes solid and/or liquid matter, the reactor 10 will include a product outlet 32A in the lower portion of the side wall 12, in communication with the fluidized bed zone 20. Where the product includes gaseous matter, including off-gases, the reactor 10 will include a product outlet 32B in the top 16 or in the upper portion of side wall 12, in communication with the freeboard zone 22. In many cases, the reactor 10 will include one outlet 32A in communication with the fluidized bed zone 20 and one outlet 32B in communication with the freeboard zone 22, and this configuration is shown in FIGS. 1A and 1B.

The area of chamber 18 from which the product is removed is sometimes referred to herein as the "product zone" 33.

The reactor 10 further comprises at least one internal barrier 34 located inside the chamber 18 and at least partly located in the fluidized bed zone 20. The reactor 10 of FIGS. 1A and 1B includes one barrier 34, which is positioned within chamber 18 so as to face in the direction of the swirling flow of the fluidized bed. Internal barrier 34 may be in the form of a flat plate or baffle and, where the side wall has a generally cylindrical shape, each barrier 34 extends radially inwardly from the side wall 12 toward the central axis Y of the reactor 10.

The barrier 34 has at least one opening 36 through which the fluidized bed may flow. The at least one opening 36 is located in a portion of the barrier 34 which is located in the fluidized bed zone 20, and therefore the at least one opening 36 will be located within the fluidized bed during use of reactor 10. The at least one opening 36 may comprise a plurality of discrete openings formed in barrier 34, or may comprise a gap between the barrier 34 and the side wall 12 and/or the bottom wall 14. In the illustrated embodiment, the barrier 34 has a bottom edge 38 which is spaced above the bottom wall 14 to provide a single opening 36 within the fluidized bed zone, this opening 36 being sometimes referred to herein as an "underflow opening". In the illustrated embodiment, the bottom edge 38 of barrier 34 lies in a horizontal plane such that the height of opening 36 is uniform along its entire width, although this may not be necessary in all embodiments. Also, as shown in FIG. 1B, the outer edge of the barrier 34 may extend radially outwardly to the side wall 12, and may be secured to side wall 12, so as to prevent flow of the fluidized bed around the outer edge of barrier 34.

The area of the at least one opening 36 relative to the area of barrier 34 is variable, and depends on the specific application. However, in typical cases, the area of barrier 34 will be greater than the area of the at least one opening 36.

The inner edge of barrier 34 may be located proximate to the central axis Y of reactor 10. In some embodiments, the reactor will include an inner side wall 40 which may also have any of the shapes described above for the outer side wall 12 and chamber 18. For example, the inner side wall shown in the drawings is in the approximate shape of a cylinder of variable diameter. The inner side wall 40 extends at least above the top of the fluidized bed, and may in some embodiments extend throughout the height of the reactor 10. Therefore, the hollow chamber 18 may have an annular horizontal cross-section throughout at least a portion of its height, and throughout the entire height of the fluidized bed zone 20.

In embodiments where the reactor 10 includes an inner side wall 40, the barrier 34 may have an inner edge which extends radially inwardly to the inner side wall 40, and may be secured to side wall 40, so as to prevent flow of the fluidized bed around the inner edge of barrier 34. In cases where reactor 10 has no inner side wall 40, the inner edge of barrier 34 may extend inwardly to a point which is at or close to the central axis Y.

The barrier 34 also has a top edge 42 which is located above the fluidized bed zone 20, so as to substantially prevent the fluidized bed from flowing over top of the barrier 34. It will be appreciated that the fluidized bed will resemble a boiling liquid and that there will be a splash zone at the top of the fluidized bed. In some embodiments, it may be desired to extend the top edge 42 of the barrier 34 above this splash zone so as to prevent liquid and/or solid material from passing over the top edge 34.

In reactor 10, the barrier 34 is located between the feed inlet 28 and the product outlet 32A, and separates the feed zone 30 from the product zone 33. The relative locations of inlet 28, outlet 32A and barrier 34 are such that the barrier 34 prevents short-circuiting of flow between the inlet 28 and outlet 32A, while maximizing the circumferential distance for flow and reaction of the fluidized bed between the inlet 28 and outlet 32A. Therefore, the inlet and outlet 28, 32A may be located close to one another, and are separated by the barrier 34.

In operation, the fluidizing medium enters the chamber 18 through the bottom wall 14, and is directed so as to create a circumferential flow. Although the illustrated embodiments show the fluidizing medium entering reactor 10 through the bottom wall 14, it will be appreciated that it may be desirable to inject the fluidizing medium through the outer side wall 12 in some cases, either instead of, or in addition to, injection through the bottom wall 14. For example, in the case of a bio reactor where a reactive biofilm is supported on relatively heavy particles in a liquid medium, it may be preferred to inject the fluidizing medium through both the bottom wall 14 and the side wall 12.

Simultaneously with injection of the fluidizing medium, a feed material is fed into the feed zone 30 of chamber 18 through the feed inlet 28, the feed material comprising liquid and/or solid material which becomes suspended in the fluidized bed, and which flows toward the inlet while undergoing transformation into one or more products within the fluidized bed. A portion of the product, comprising a liquid and/or solid material, will be withdrawn from the chamber 18 through the product outlet 32A which is in communication with the fluidized bed zone 20, while a portion of the product will be carried by the fluidized bed, through the underflow opening 36 of the barrier 34, to the feed zone 30 where additional feed material is added to the fluidized bed. Simultaneously, a gaseous product which may comprise an off-gas, enters the freeboard zone 22 and is exhausted through the product outlet 32B in communication with the freeboard zone 22.

The reactor 10 in FIGS. 1A and 1B therefore provides for re-circulation or recycling of a controlled portion of the product from the product zone 33 to the feed zone 30. This "internal recirculation" of a portion of the product eliminates the need for an external recirculation circuit, whereby a portion of the product is removed from the product zone 33 through outlet 28 and is then re-introduced into the feed zone 30. The controlled re-circulation of a portion of the product also provides heated and/or reactive particulate material to the feed zone 30 to supply heat and/or catalysis to the material entering chamber 18 through the feed inlet 28. This may permit the reduction or elimination of external heating and/or regeneration and circulation of sand or other particulate material as a heat and/or catalyst source for the incoming feed material.

Figure 2A:
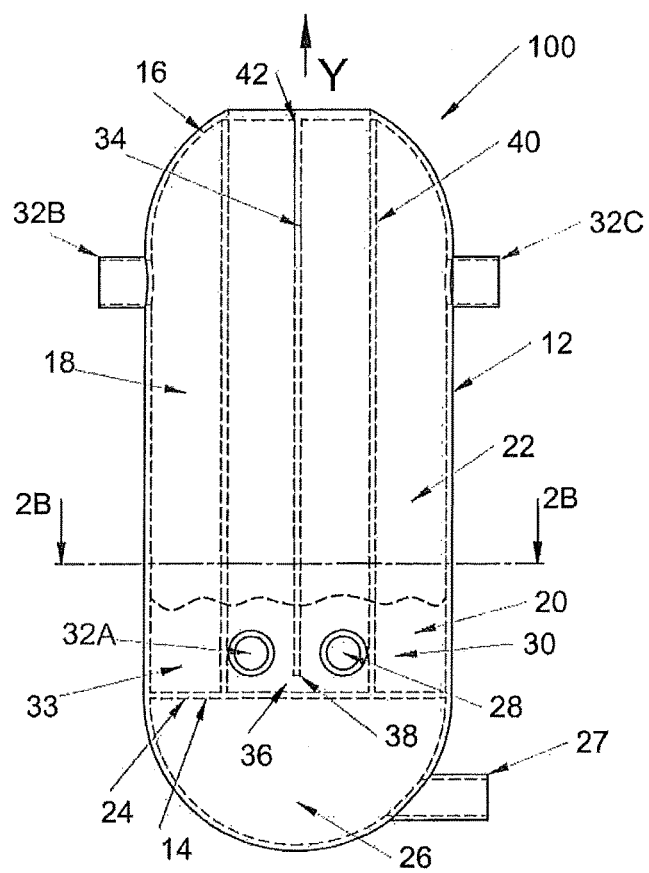
FIGS. 2A and 2B are side and top sectional views of a plug flow, fluidized bed reactor according to a second embodiment, having two underflow weirs.
Figure 2B:
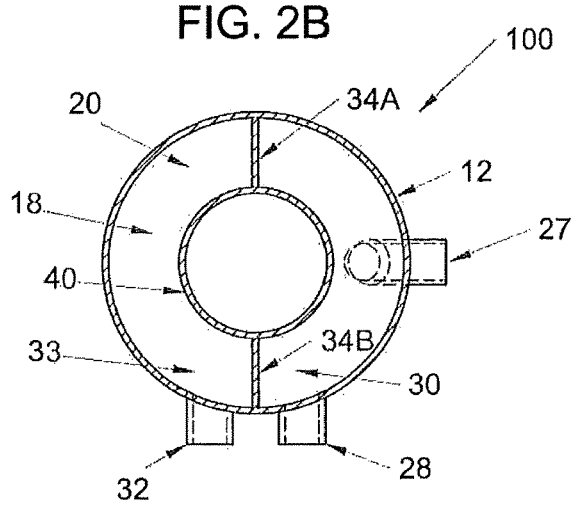

FIGS. 2A and 2B illustrate a reactor 100 according to a second embodiment. Reactor 100 includes many of the same elements as reactor 10, and like elements of reactor 100 are identified by like reference numerals, and the above description applies equally to these elements. The following description will focus on the differences between reactors 10 and 100.

The primary difference between reactor 100 and reactor 10 is that reactor 100 includes two barriers 34, labeled as 34A and 34B in FIG. 2B. Also, in contrast to the first embodiment, the barriers 34A and 34B extend throughout the entire height of the reactor so as to divide the hollow chamber 18 into two sections, also referred to herein as the feed zone 30 and the product zone 33. In the second embodiment, the barriers 34A and 34B not only divide the fluidized bed zone 20, but also divide the freeboard zone 22, with the only communication between the feed zone 30 and the product zone 33 being provided through the underflow openings 36 of the barriers 34A and 34B. The barriers 34A and 34B are shown in FIG. 2B as being separated by about 180 degrees, although it will be appreciated that the amount of circumferential spacing between barriers 34A and 34B may be variable. Also, in some embodiments, it may be desired to provide a reactor having more than two barriers 34.

The separation between the feed zone 30 from the product zone 33 in reactor 100 permits multi-stage processing of the feed material in a single reactor having a single fluidized bed. This eliminates the need for a separate reactor for each stage of the processing.

In some embodiments, the two stages may require the use of different fluidizing media. Accordingly, the fluidizing medium inlets 28 may be divided into two sub-groups, one sub-group of inlets 28 being provided to feed a first fluidizing medium into the feed zone 30 and another sub-group of inlets 28 being provided to feed a second fluidizing medium into the product zone 33. Also, the separation of the feed zone 30 and product zone 33 requires that at least one product outlet 32 is provided in each of said zones 30, 33. Typically, the feed zone 30 and product zone 33 will each include a gaseous product outlet 32B, 32C in communication with the freeboard zone 20, while the product zone 33 may be provided with a product outlet 32A for a liquid and/or solid product in communication with the product zone 33.

Accordingly, the configuration of reactor 100 provides controlled recirculation of a controlled portion of the product from the product zone 33 to the feed zone 30. As in reactor 10, the internal recirculation of a portion of the product eliminates the need for an external recirculation circuit, and may also permit the reduction or elimination of external heating and input of sand or other particulate material as a heat source for the incoming feed material. Also, as mentioned above, the reactor 100 provides the added benefit of permitting multi-stage processing of the feed material in a single reactor.

Specific applications of reactors incorporating the features of reactors 10 and 100 are now described below with reference to FIGS. 3-7.

FIG. 3—Coal Drying

The drying of anthracite and bituminous coal from moisture contents of 10-15 wt % down to values of less than 2% is important for many metallurgical operations. Current technologies for drying coal include rotary louver dryers and vibrating fluid bed dryers. A coal dryer having the configuration of reactor 10 is shown in FIG. 3, in which wet coal is supplied to the fluidized bed through feed inlet 28 and dry coal is withdrawn from the fluidized bed through outlet 32A. The fluidizing medium injected through bottom wall 14 comprises preheated air or recycled inert gas.

A portion of the dry coal is internally recirculated from the product zone to the feed zone through the underflow opening 36 of the barrier 34. Therefore, dry coal serves as the bed material to which the wet material is fed. This eliminates the problem of de-fluidization of the wet feed material, which currently prevents the adoption of a plug flow type fluid bed. The excellent gas/solids mixing in the fluidized bed provides improved fuel efficiency compared to rotary louver dryers, and the simple structure of the dryer should provide cost and maintenance advantages when compared to rotary louver and vibrating fluid bed dryers.

It will be appreciated that essentially the same process and apparatus can be applied to the drying of other particulate matter, such as wet particles of wood or plastic.

FIG. 4—Arsenic (Gold Ore) Roasting

Two stage roasting is a common method of pre-treating arsenic-bearing refractory gold ores. Sulfur and carbon most be removed (oxidized) to allow access to the gold and prevent pregrobbing by the carbon. During oxidation, arsenic can form ferric arsenate and encapsulate gold (resulting in lower Au recovery) and therefore must first be removed in a reducing/neutral roast, the removed arsenic species comprising arsenic and/or volatile arsenic compounds.

A roasting apparatus having the configuration of reactor 100 is shown in FIG. 4, in which gold ore and/or gold ore concentrate is supplied to the fluidized bed through feed inlet 28 and undergoes two-stage processing, the first stage being a reduction (endothermic) and the second stage being an oxidation (exothermic). The fluidizing medium for the first stage comprises sub-stoichiometric air or nitrogen, and the fluidizing medium for the second stage comprises air or oxygen.

The product is oxidized calcine which is withdrawn from the fluidized bed through outlet 32A. A portion of the oxidized calcine is internally recirculated back to the feed zone 30 through underflow opening 36 of barrier 34B to serve as a heat source for the reducing stage.

Plug flow allows for both stages (oxidizing and reducing) to occur in the single reactor at different points and might allow for lower S, As and C levels due to limited backmixing. Also, the elimination of a second fluid bed is expected to provide lower capital costs and a reduction in fuel consumption in the reducing stage is expected to reduce operating costs.

FIG. 5—Biomass Pyrolysis

Charcoal/biochar has a number of industrial uses, and may be produced by pyrolysis of biomass in a reactor containing a fluidized bed containing sand.

A pyrolysis apparatus having the configuration of reactor 100 is shown in FIG. 5, in which biomass is supplied to the fluidized bed through feed inlet 28, optionally in combination with inert particulate matter such as sand, and undergoes two-stage processing, the first stage being pyrolysis and the second stage comprising re-heating of the fluidized bed. The fluidizing medium for the first stage comprises pre-heated air or nitrogen, and the fluidizing medium for the second stage comprises air.

The product is biochar which is withdrawn from the fluidized bed through outlet 32A. A portion of the hot biochar is internally recirculated back to the feed zone to serve as a heat source for the pyrolysis stage and to aid in fluidization of the feed material.

Similar reactor configurations can be used for a variety of pyrolysis/cracking applications, including the production of activated carbon from biomass, and the upgrading of heavy oil by fluid coking or fluid catalytic cracking.

FIG. 6—Catalytic Reactor

A catalytic reactor having the configuration of reactor 100 is shown in FIG. 6, in which one or more gaseous, liquid and/or solid chemical reactants, are supplied to the fluidized bed through feed inlet 28 and/or through the bottom wall 14 to undergo two-stage processing, the first stage being a catalytic reaction and the second stage being regeneration of the catalyst. Separate fluidizing media are supplied to each stage, the compositions of the fluidizing media being dependent on the specific process being conducted in reactor 100. For example, the fluidizing medium supplied to the first stage may comprise one or more reactants, nitrogen, air, etc., while the fluidizing medium supplied to the second stage may comprise air.

No product outlet 32A is shown in the reactor 100 of FIG. 6. However, it will be appreciated that the reactor 100 may include at least one product outlet 32B or 32C which communicates with the freeboard zone 22, as shown in FIG. 2A. Although not shown, it will be appreciated that it may be desired to provide a product outlet 32A communicating with the fluid bed zone for removal of product and/or for removal of poisoned catalyst. It will also be appreciated that fresh catalyst may be added through inlet 28.

Similar reactor configurations can be used for a variety of chemical applications, including dehydrogenation of butane and/or propane, production of maleic anhydride from butane, and production of 3,4-ethylenedioxythiophene.

FIG. 7—Aerobic/Anaerobic Bio Reactor

The use of a two stage recirculating fluid bed process for biological treatment of waste water (C, P and N removal) has recently been proposed in U.S. Pat. No. 7,261,811. This process includes re-circulating solids with biofilm between two fluidized beds (Anaerobic and Aerobic zones), and uses two reactors with solids transferred between them, the solids comprising suspended particulate matter with a coating of reactive biofilm. The liquid used as fluidizing agent is recycled and goes through multiple passes.

An aerobic/anaerobic bio reactor having the configuration of reactor 100 is shown in FIG. 7, in which raw waste water is supplied to the fluidized bed through feed inlet 28 and undergoes two-stage processing, the first stage comprising an anoxic zone and the second stage comprising an aerobic zone in which the biofilm is aerated and regenerated. The fluid bed containing the regenerated biofilm is then recirculated from the aerobic zone to the anoxic zone. The fluidizing medium for the first stage comprises waste water, and the fluidizing medium for the second stage comprises partially treated waste water from the first stage, with air and/or oxygen.

The product is treated waste water which is withdrawn from the fluidized bed through outlet 32. A portion of the treated waste water with the aerated and regenerated biofilm is internally recirculated back to the feed zone through the underflow opening 36 of barrier 34B to combine with waste water entering the chamber 18 through the inlet 28.

Also, as shown in FIG. 7, a portion of the treated waste water may be recycled back to the second stage, while a portion of the waste water treated in the anoxic zone may be recycled back to the aerobic zone and/or the anoxic zone.

Although the invention has been described with reference to certain specific embodiments, it is not limited thereto. Rather, the invention includes all embodiments which may fall within the scope of the following claims.

What is claimed is:

1. A reactor comprising:
an outer sidewall and a bottom wall enclosing a hollow chamber in the form of a closed loop for circulation of a fluidized bed, the hollow chamber having a fluidized bed zone with a first product outlet and a freeboard zone with a second product outlet, wherein the outer sidewall has a substantially cylindrical shape, and has a central axis;
a plurality of fluidizing medium inlets for injection of at least one fluidizing medium into the fluidized bed zone, wherein the fluidizing medium inlets are located in the bottom wall and/or the outer side wall of the reactor, in communication with the fluidized bed zone, and the fluidizing medium inlets comprise gas and/or liquid injectors which are directed in a direction of a circumferential, swirling fluid flow and which are adapted to create the circumferential, swirling flow of material in the fluidized bed zone;
at least one feed inlet communicating with the fluidized bed zone;
and
a planar plate extending radially from the outer sidewall toward the central axis, thereby defining a further wall of the hollow chamber and at least partly located in the fluidized bed zone, wherein each said planar plate is positioned to face in a direction of said swirling flow, and each said planar plate has at least one opening within the fluidized bed zone.

2. The reactor of claim 1, wherein each said planar plate has a bottom edge which is spaced above the bottom wall, and wherein said at least one opening comprises an underflow opening within the fluidized bed zone, between the bottom wall and the bottom edge of the planar plate.

3. The reactor of claim 1, wherein the reactor further comprises a substantially cylindrical inner sidewall.

4. The reactor of claim 1, wherein said planar plate is located between the feed inlet and the first product outlet, so as to prevent short-circuiting of flow between the feed inlet and the first product outlet.

5. The reactor of claim 4, wherein both the feed inlet and the first product outlet are provided in the outer sidewall and communicate with the fluidized bed zone.

6. The reactor of claim 1, wherein each said planar plate has a top edge located above the fluidized bed zone.

7. The reactor of claim 1, wherein the reactor comprises a particulate dryer, and wherein: the plurality of fluidizing medium inlets are located in the bottom wall; the feed inlet is adapted for receiving particulate solids to be dried; the particulate dryer includes the second product outlet, wherein the first product outlet communicates with the fluidized bed zone and the second product outlet communicates with the freeboard zone; the planar plate is located between the feed inlet and the first product outlet, and wherein the barrier planar plate has a top edge which is located proximate to a top of the fluidized bed zone.

8. A method for drying wet particulate solids in a dryer, the dryer including:

an outer sidewall and a bottom wall enclosing a hollow chamber in the form of a closed loop for circulation of a fluidized bed, the hollow chamber comprising a fluidized bed zone and a freeboard zone, wherein the outer sidewall has a substantially cylindrical shape and has a central axis;

a plurality of gas injectors for injection of gas into the fluidized bed zone, wherein the fluidizing medium inlets are located in the bottom wall, in communication with the fluidized bed zone, and the fluidizing medium inlets are directed in a direction of a circumferential, swirling fluid flow and which are adapted to create the circumferential, swirling flow of material in the fluidized bed zone;

a feed inlet adapted to communicate the wet particulate solids into the fluidized bed zone;

a first product outlet communicating with the fluidized bed zone;

a second product outlet communicating with the freeboard zone; and a planar plate extending radially from the outer sidewall toward the central axis, thereby defining a further wall of the hollow chamber between the feed inlet and the first product outlet and at least partly located in the fluidized bed zone, the planar plate is positioned to face in a direction of said swirling flow, and the planar plate has at least one opening within the fluidized bed zone;

the method comprising:

receiving said wet particulate solids in a fluidized bed of dried particles in the fluidized bed zone;

injecting said gas into the fluidized bed zone;

drying the wet particulate solids with said gas as the fluidized bed flows from the feed inlet toward the first product outlet;

recovering a first portion of the dried particulate solids through the first product outlet;

recycling a second portion of the dried particulate solids by permitting the second portion to flow through said at least one opening to combine with said wet particulate solids entering the chamber through said feed inlet; and discharging said gas from said product outlet.

* * * * *

UNITED STATES PATENT AND TRADEMARK OFFICE
CERTIFICATE OF CORRECTION

| | | |
|---|---|---|
| PATENT NO. | : 10,315,176 B2 | Page 1 of 1 |
| APPLICATION NO. | : 15/317416 | |
| DATED | : June 11, 2019 | |
| INVENTOR(S) | : Kamal Adham et al. | |

It is certified that error appears in the above-identified patent and that said Letters Patent is hereby corrected as shown below:

In the Claims

In Column 12, Line 63, delete "barrier"

Signed and Sealed this
Third Day of September, 2019

Andrei Iancu
*Director of the United States Patent and Trademark Office*